No. 778,850. PATENTED JAN. 3, 1905.
W. H. EMOND.
CUSHION TIRE.
APPLICATION FILED FEB. 12, 1902.
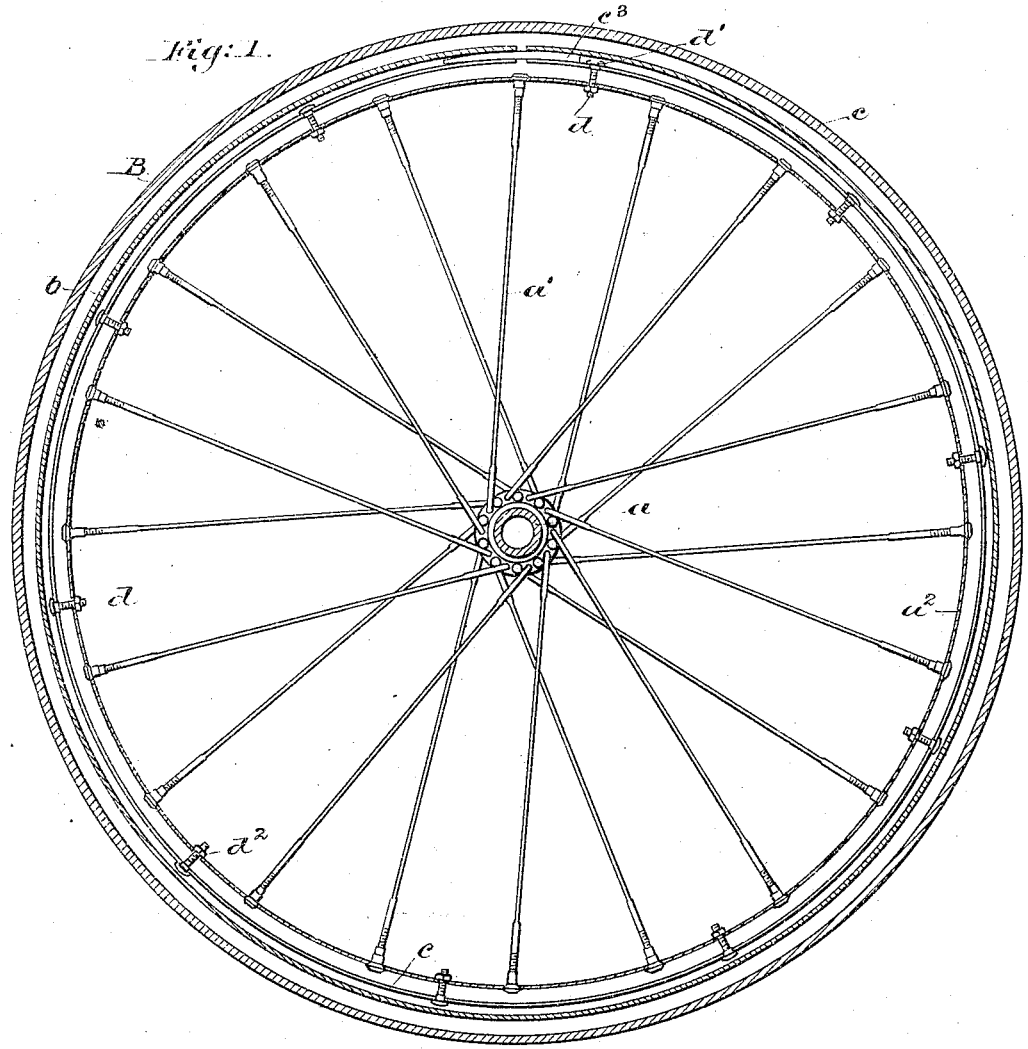
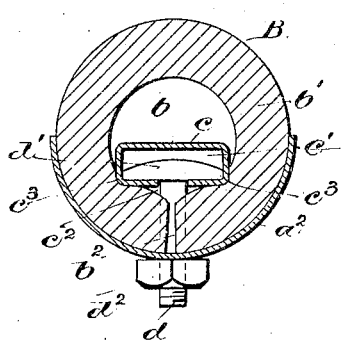
Witnesses.
Everett S. Emery
A. E. Chesley
Inventor,
William H. Emond.
by Frederick L. Emery
Atty No. 778,850.

Patented January 3, 1905.

UNITED STATES PATENT OFFICE.

WILLIAM H. EMOND, OF BOSTON, MASSACHUSETTS.

CUSHION-TIRE.

SPECIFICATION forming part of Letters Patent No. 778,850, dated January 3, 1905.

Application filed February 12, 1902. Serial No. 93,713.

*To all whom it may concern:*

Be it known that I, WILLIAM H. EMOND, a citizen of the United States, residing at Boston, in the county of Suffolk and State of Massachusetts, have invented an Improvement in Cushion-Tires, of which the following description, in connection with the accompanying drawings, is a specification, like letters on the drawings representing like parts.

My invention relates to cushion-tires for road-vehicles and the like, whether or not they may be self-propelling.

Pneumatic tires for vehicles are open to serious objection because of their liability to puncture and become deflated, this objection having of late proven so great that the use thereof has become greatly diminished.

One of the advantages of the pneumatic tire as generally used is the convenience and facility with which it may be manufactured by rolling it up upon mandrels and joining its ends for vulcanization, usually in molds, and in tires of this sort the inflation is largely relied upon to retain the tire in its position upon the wheel-rim.

One of the aims of my present invention is to provide a cushion-tire that may be made, if desired, after the general manner of a pneumatic tire, with all the advantages attending such mode of manufacture, yet which may be secured uniformly to the wheel-rim without inflation thereof—in fact, in a deflated condition—the inherent resilient strength of the walls of the tire both by reason of the structure thereof and also by reason of the mode of attachment of the tire to the wheel-rim serving to maintain the tire in proper shape for use.

My invention will best be understood after a description of one embodiment thereof.

In the accompanying drawings, Figure 1, in side elevation, partial section, shows a typical metallic-rimmed wheel equipped with a tire illustrating my invention; and Fig. 2, an enlarged cross-section of a tire and wheel-rim, showing the mode of attachment of the tire, Fig. 1.

In the particular embodiment of my invention selected for illustration and shown in the drawings the wheel, comprising the hub $a$, spokes $a'$, and rim $a^2$, may be of any suitable or desired construction. While I have here shown for convenience a typical wire wheel, yet my invention is equally applicable to wheels of other construction. The tire B, as here shown, is ring-like and endless in its completed form and of a generally-circular cross-section both as to its exterior or peripheral shape and also the shape of the internal bore $b$. While this shape is preferable for obvious reasons, yet my construction is not necessarily restricted to such shape. The tire B, as here shown, may be made up in desired manner—for instance, following the method of manufacture of the ordinary single-tube pneumatic tire—the walls $b'$ being composed, it may be, of superimposed rubber and textile layers disposed and arranged relative to each other in suitable or desired manner to give the desired stability, resiliency, and resistance to puncture so much desired in tires of this general type. Having been formed in this manner and with the walls of the internal bore $b$ circular in cross-sectional outline or otherwise symmetrically shaped, as distinguished from tires the internal bores of which are formed with recesses or cavities specially provided for the reception of locking devices, the tire is slit, preferably radially, from its inner circumference through into the internal bore $b$, as indicated at $b^2$, Fig. 2, to permit of the introduction of the fastening devices. Through the slit $b^2$ is inserted the fastening member $c$, here shown as a single ring-like member substantially encircling the wheel and preferably of rectangular cross-sectional shape, as shown, forming a contained annular chamber $c'$ with an internal entrance-opening $c^2$ thereto. While I prefer the rectangular cross-sectional shape shown for the fastening member $c$ because of its convenience of manufacture, compactness, and inherent stiffness and inflexibility, yet said member may be otherwise suitably shaped, if desired, so long as it possesses the requisite strength and also the desired external shape to enable it properly to engage and hold the tire, as will be described. After the clamping member has been inserted in the tire the latter is stretched over the flanges of the wheel-rim, the clamping member opening up sufficiently to enable the tire to be so stretched. One of the ends of the ring-like clamping member is provided with a dowel $c^3$, Fig. 1, which enters the opposed end of said member and retains the two members in alinement during the time it is opened up or extended when the tire is being stretched over the wheel-rim.

Instead of inserting the clamping member in the tire before the latter is stretched over the flanges of the wheel-rim said clamping member may be first placed upon the wheel-rim and the tire spread open around its inner diameter and the edges of the tire slid under the clamping member, being then in the same condition as if the clamping member were first inserted in the tire and the latter stretched over and upon the wheel-rim. Having been placed in position upon the wheel-rim, the clamping member is contracted circumferentially and radially by suitable clamping devices, as bolts $d$. These bolts are provided with heads $d'$, that are slid into the clamping member before the latter is inserted in the tire, the shanks of the bolts protruding through the opening $c^2$ in the clamping member and extending outward through the slot $b^2$ or enlargements thereof in the tire and are passed through openings provided therefor in the wheel-rim when the tire is slid upon the rim. While these bolts are spaced at a considerable distance one from another, yet as the nuts $d^2$ thereon are screwed onto the bolts to draw the latter toward the bottom of the wheel-rim the clamping member $c$, by reason of its inherent stability or rigidity, is constructed uniformly throughout its entire length, thereby pressing all parts of the tire uniformly upon the steel rim. If the clamping member were a thin flexible strip or were otherwise shaped so that it had no inherent stability, the tightening of each fastening device or bolt would draw the clamping member adjacent said device or bolt down to and upon the steel rim, but would leave the intervening sections of the clamping member bulged outward without exerting any clamping effect to hold the tire; but with an inherently rigid or stiff clamping member, such as here shown, whether or not provided with a tubular cross-sectional shape for that purpose, the drawing of said member inward by fastening devices located at separated points causes the entire member to contract substantially uniformly while maintaining its circular contour, thus insuring a uniform clamping pressure at all points around the wheel-rim, the ends of the clamping member gradually closing together as the diameter of its circle lessens.

Since the wall of the internal bore of the tire is substantially symmetrical or regular, the efficiency of the clamping action of the member $c$ depends upon the secure engagement thereof with the walls of said internal bore, and since the latter has no recesses or shoulders behind which a properly-shaped clamping member may fall or engage I have provided said clamping member, as here shown, with pronounced though slightly-rounded clamping edges $c^3$, which, as the said member is contracted in diameter or drawn toward the wheel-rim by the fastening device, impress themselves into the smooth or symmetrical walls of the internal bore, and thus produce a deformation of the walls of said bore, such as to cause the tire to be formally locked and secured between the clamping member and the wheel-rim. Thus by referring to Fig. 2 it will be seen that the clamping member, when drawn inward, by impressing its edges $c^3$ into the walls of the internal bore causes the material of the tire-walls below the clamping member to be bulged or extended sufficiently to provide distinct locking edges of such thickness as to insure proper attachment of such walls to the wheel-rim.

It will be observed in the embodiment shown that the sides or flanges of the rim or channel extend above and beyond the point where the tire is deformed and compressed to embrace a portion of the side walls of the tire. These extended flanges confine the tire where it tends to bulge out above the point of deformation. This provides an enlarged tire portion at the base of the side walls, while the clamping members and the flanges combine to hold this portion rigidly, giving added stiffness and firmness to the supporting arched tread portion and producing a tire more suited for resisting the weight carried by the wheel.

The heads of the attaching-bolts $d$ are shown as slabbed off at their sides, Fig. 2, to travel in contact with the vertical walls of the clamping member $c$, thus to guide the bolts within the clamping member, so that they may be slid easily along within the latter to enable them to be inserted in the holes therefor in the wheel-rim without danger of their becoming wedged or otherwise locked against free movement. The shanks of the bolts where they pass through the slot $c^2$ of the clamping member are preferably squared to aid in preventing rotation of the bolt while the nut thereon is being tightened, and the bearing of the sides of the bolt-head against the vertical walls of the clamping member prevents this squared shank of the bolt from turning and locking between the walls of the slot in the clamping member. It is safer to rely upon the bolt-head as a guide to prevent twisting of the bolt when sliding the latter, because of its greater diameter, than to rely upon the squared portion of the smaller shank of the bolt.

My invention is not restricted to the particular embodiment thereof here shown, but may be varied within the spirit and scope of my invention as set forth in the appended claims.

I claim—

1. A cushion-tire having normally a symmetrically-shaped bore containing a tubular slotted deforming clamping member having a clamping-surface of different configuration from the normal configuration of the adjacent wall of said bore, and adapted to impinge upon the walls of said bore and by deformation thereof lock the tire in position, and clamping devices engaging the interior of said clamping member and passing outward therefrom through the slot therein.

2. A cushion-tire having an internal bore and containing a tubular slotted deforming clamping member rectangular in cross-sectional shape and adapted to impinge upon the walls of said bore and by deformation thereof lock the latter in position, and clamping-bolts to pass through the slot in said clamping member and having heads within said clamping member to operate as described.

3. A cushion-tire having an internal bore containing a single ring-like divided deforming clamping member with a guiding device connecting the separated ends thereof to preserve alinement of the latter while permitting free expansion and contraction of said ring-like member, and clamping devices coöperating with said clamping member to contract the latter in diameter to secure the tire upon the wheel-rim.

4. A cushion-tire having its bore provided with a tubular slotted clamping-ring divided and provided with a dowel connecting its separated ends to preserve alinement thereof while permitting expansion and contraction of said clamping member, and clamping-bolts coöperating with said divided clamping member.

5. A cushion-tire of substantially symmetrical cross-section containing an internal clamping member having a clamping-surface of different configuration from the normal configuration of the adjacent wall of the bore of said tire adapted to impinge upon the walls of said bore and by deformation thereof lock the latter in position, clamping devices coöperating with said clamping member and a rim or channel having flanges extending beyond the compressed portions of said tire to embrace a portion of the side walls thereof and confine the enlarged portion caused by said clamping member, said flanges and clamping member combining to produce an arched tread with stiffened side walls.

6. A cushion-tire having a bore of substantially circular cross-section, an internally-slotted ring-like clamping member having a clamping-surface of different configuration from the normal configuration of the adjacent wall of the bore of said tire adapted to impinge upon the wall of said bore and by deformation thereof lock the latter in position, clamping devices coöperating with said clamping member and the slot therein, and a rim or channel having flanges extending beyond the compressed portions of said tire to embrace a portion of the side walls thereof and confine the enlarged portion caused by the said clamping member, said flanges and clamping member combining to produce an arched tread with stiffened side walls.

7. A cushion-tire having its bore provided with a tubular continuously-slotted clamping-ring having a single division and provided with alining means connecting its separate ends to preserve alinement thereof while permitting extension and contraction of said clamping member and clamping-bolts coöperating with said divided clamping member and the slot therein.

In testimony whereof I have signed my name to this specification in the presence of two subscribing witnesses.

WILLIAM H. EMOND.

Witnesses:
 FREDERICK L. EMERY,
 EVERETT S. EMERY.